(12) United States Patent
Otoguro et al.

(10) Patent No.: US 8,902,268 B2
(45) Date of Patent: Dec. 2, 2014

(54) OPTICAL SCANNING APPARATUS AND IMAGE FORMING APPARATUS

(71) Applicant: Canon Kabushiki Kaisha, Tokyo (JP)

(72) Inventors: Yasuaki Otoguro, Abiko (JP); Takehiro Ishidate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/203,199

(22) Filed: Mar. 10, 2014

(65) Prior Publication Data

US 2014/0267529 A1    Sep. 18, 2014

(30) Foreign Application Priority Data

Mar. 12, 2013   (JE) ................................. 2013-049101

(51) Int. Cl.
*B41J 27/00*   (2006.01)
*B41J 2/435*   (2006.01)
*B41J 15/14*   (2006.01)
*B41J 2/385*   (2006.01)
*G02B 26/12*   (2006.01)
*G03G 13/04*   (2006.01)

(52) U.S. Cl.
CPC .............. *G02B 26/125* (2013.01); *G03G 13/04* (2013.01)

USPC ........... 347/257; 347/256; 347/263; 347/241; 347/242; 347/134

(58) Field of Classification Search
USPC .................. 347/134, 241–242, 256–257, 263
See application file for complete search history.

(56) References Cited

U.S. PATENT DOCUMENTS 8,446,447 B2 *   5/2013   Kato et al. .................... 347/242

FOREIGN PATENT DOCUMENTS

JP       2008-9319   A        1/2008
JP       2008009319  A    *   1/2008

* cited by examiner

*Primary Examiner* — Sarah Al Hashimi
(74) *Attorney, Agent, or Firm* — Canon USA Inc IP Division (57) ABSTRACT

An optical scanning apparatus capable of fixing an optical member using a plate spring without forming a die cut hole and thus having high dust-proof performance includes a mirror supporting portion supporting a reflection mirror, and a projecting portion configured to form a gap between the reflection mirror supported on the mirror supporting portion and itself, and to deform the plate spring with the reflection mirror, and the projecting portion is provided with a cut hole for engaging the plate spring.

17 Claims, 9 Drawing Sheets

OPTICAL SCANNING APPARATUS AND IMAGE FORMING APPARATUS

BACKGROUND OF THE INVENTION

1. Field of the Invention

The present invention relates to a dust-proof measure for a casing of an optical scanning apparatus used for an image forming apparatus such as a copying machine, a printer, a facsimile, or their multifunction peripheral.

2. Description of the Related Art

Figure 7:
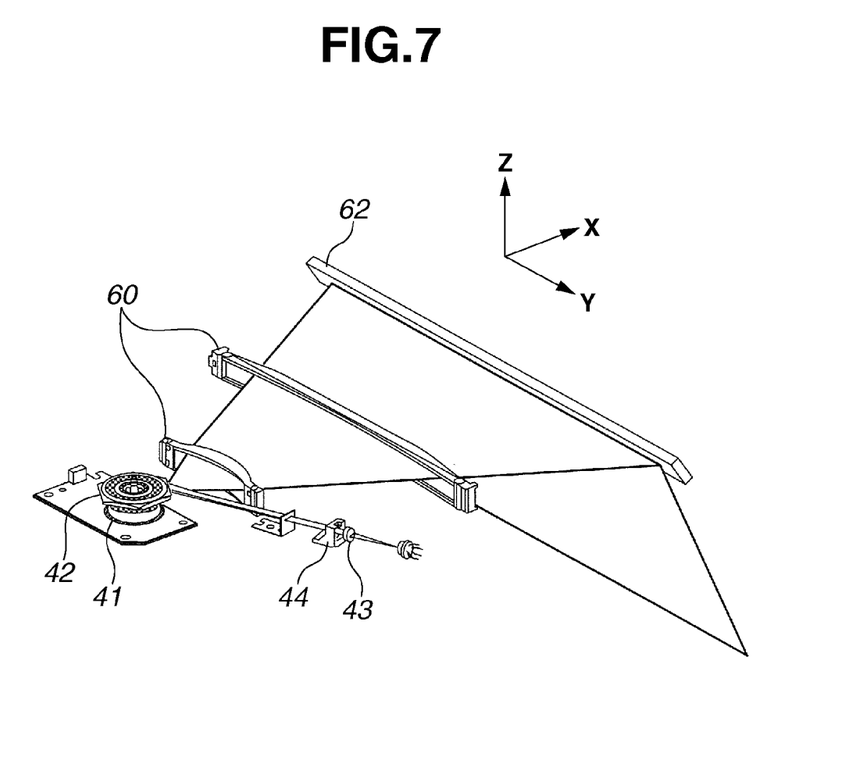
FIG. 7 is a schematic configuration diagram illustrating a configuration of an optical scanning apparatus according to a conventional example.

As an optical scanning apparatus used for an electrophotographic image forming apparatus, an optical scanning apparatus having the following configuration has been well-known. The optical scanning apparatus forms a latent image on a photosensitive member by deflecting a light beam emitted from a light source using a rotating polygonal mirror and guiding the deflected light beam onto the photosensitive member using an optical component including a lens or a mirror. FIG. 7 illustrates an outline of components of a conventional optical scanning apparatus that has generally been used. When dirt such as dust adheres to an optical component installed in the optical scanning apparatus, the dust adhering thereto blocks a light beam. Thus, an amount of the light beam on a photosensitive member decreases. With the decrease in the light amount of the light beam, an image is not output at a desired density. In recent years, amounts of fine dust and a chemical substance having a size of 1 μm or less in the air has increased. Deterioration in image quality due to dirt on the optical component has been becoming an issue more than before. Usually, the optical component serving as the component of the optical scanning apparatus is accommodated in a casing illustrated in FIGS. 8A, 8B, and 8C described below to protect the optical component from a substance causing dirt.

Figure 8A:
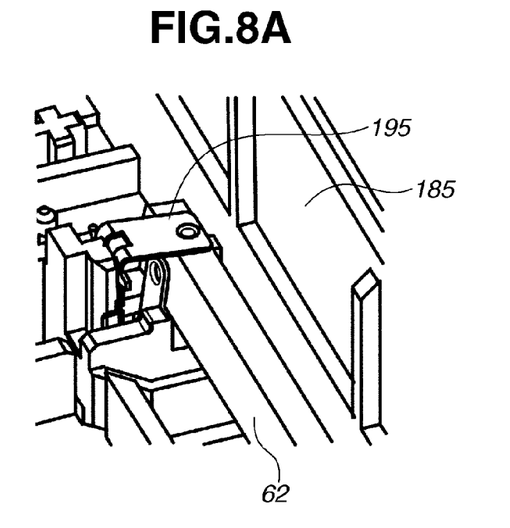
FIGS. 8A, 8B, and 8C are schematic diagrams illustrating a retaining configuration of an optical component according to the conventional example.
Figure 8B:
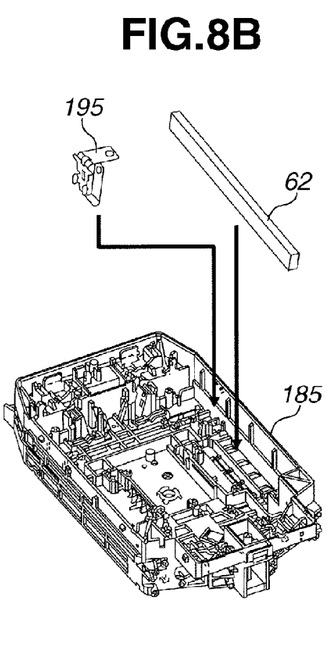
Figure 8C:
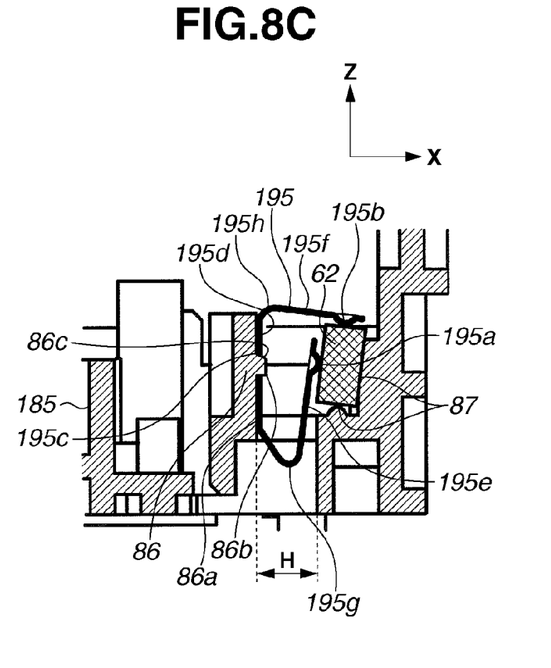
Figure 9A:
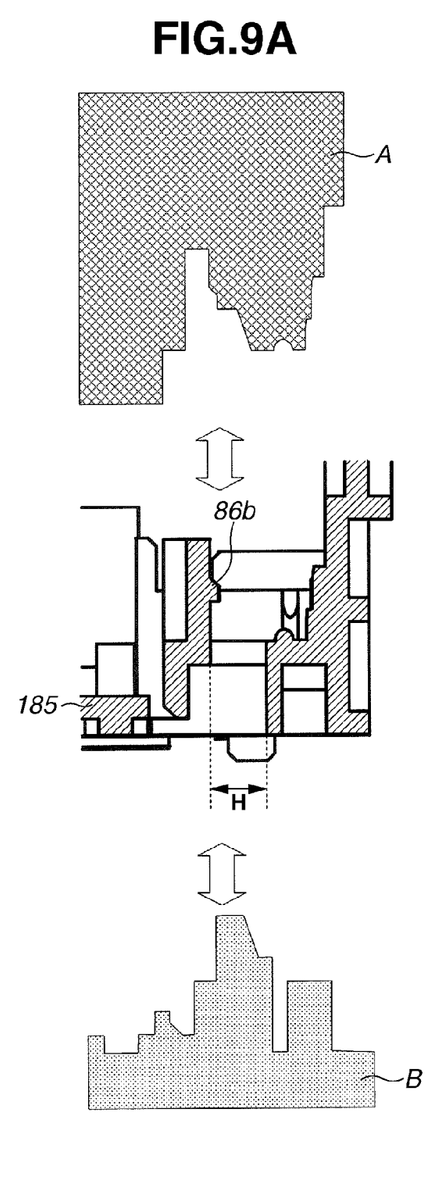
FIGS. 9A and 9B illustrate a die structure when a casing according to the conventional example is formed.
Figure 9B:
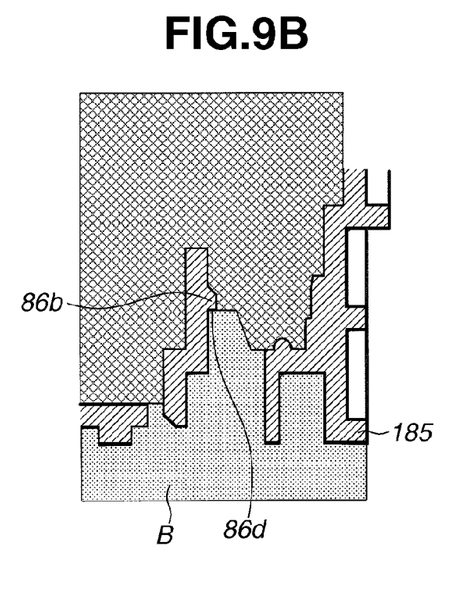

FIGS. 8A, 8B, and 8C are schematic configuration diagrams illustrating a retaining configuration of an optical component in a casing 185 of a conventional optical scanning apparatus. As a material for the casing 185, resin or a metal member is generally used, and is formed by a die. On the outer wall of the casing 185, a number of die cut holes H for forming an engaging portion 86b are formed. A plate spring for fixing an optical member is attached to the engaging portion 86b. FIGS. 9A and 9B illustrate how the die cut hole H is formed during the formation of the casing 185. The detailed description thereof will be given in an exemplary embodiment described below. In a conventional product, the die cut holes H are covered by affixing a number of sheet-type sealing members to the outer wall of the casing 185 to prevent the optical component from being soiled by dust, which has passed through the die cut holes H, adhering thereto. However, the casing 185 may have a number of ribs installed therein from the necessity of ensuring rigidity and may have a complicated shape due to an arrangement constraint of units around the image forming apparatus. If the ribs are formed at positions where they prohibit the sealing members from being affixed, the die cut holes H cannot be completely sealed by the sealing members. There is no other choice but to affix the sealing members by hands. Thus, a human error in the affixing may occur.

Furthermore, with a recent increase in an image forming speed, the rotating polygonal mirror needs to rotate at high speed. When the rotating polygonal mirror rotates at high speed, air current is generated in the optical scanning apparatus. The air current causes a large pressure distribution difference in an inner space of the optical scanning apparatus. Depending on areas, air flows from inside to outside or from outside to inside. A force caused by the air current is exerted on the optical scanning apparatus more greatly than that in a conventional example. Air flowing from outside to inside includes fine dust that soils the optical component. Thus, as the apparatus operates, more fine dust enters inward. The fine dust adheres to a surface of the optical component and the inside of the casing 185. Particularly, dust carried by surrounding air current and the rotating polygonal mirror rotating at high speed collide with each other. Thus, the dust is likely to adhere to a reflection surface of the rotating polygonal mirror. More specifically, when the rotating polygonal mirror rotates, a Karman vortex and turbulence are generated around the reflection surface of the rotating polygonal mirror, and the air current carrying the dust violently collides with the reflection surface. As a result, the fine dust is accumulated on the reflection surface of the rotating polygonal mirror. Thus, dirt may increase from an area where an amount of collision of the air current is large, so that the reflectance of the reflection surface decreases. The amount of the light beam to be guided onto the photosensitive member decreases, so that the image density decreases.

To solve such an issue that the optical component is soiled, a configuration in which the die cut holes H are covered using a part of the plate spring installed inside the casing 185 has been proposed. According to an optical scanning apparatus discussed in Japanese Patent Application Laid-Open No. 2008-9319, for example, an opening portion to be formed when a casing is formed is covered by bending a tip end of a plate spring to ensure sealability of the apparatus.

In a configuration discussed in Japanese Patent Application Laid-Open No. 2008-9319, unlike a material such as a rubber material or a sponge material, hard materials such as the plate spring and the casing are fitted to each other. Thus, it is difficult to completely cover the opening portion. If flatness and straightness of a contact surface between the plate spring and the casing 185 are distorted even by several micrometers, surface contact or line contact cannot be made but partial point contact is made between the plate spring and the casing. Thus, a gap is formed between the plate spring and the casing. In other words, a gap formed in a portion where the plate spring and the casing are in point contact may be unsealable. Therefore, dust of several hundred micrometers can be prevented from entering. However, fine particles in the order of several micrometers as described above cannot be prevented from entering.

SUMMARY OF THE INVENTION

The present disclosure is directed to an optical scanning apparatus capable of fixing an optical member using a plate spring without forming a die cut hole and thus having high dust-proof performance.

According to an aspect of the present disclosure, an optical scanning apparatus having a light source configured to emit a light beam, a rotating polygonal mirror configured to deflect the light beam emitted from the light source so that a photosensitive member is scanned with the light beam, an optical member configured to guide the light beam deflected by the rotating polygonal mirror to the photosensitive member, and a casing housing the optical member therein, the optical scanning apparatus includes a supporting portion formed integrally with the casing inside the casing and supporting the optical member, a gap forming portion formed integrally with the casing inside the casing so a gap is formed between the optical member supported by the supporting portion and the gap forming portion, and a plate spring including a pressing portion configured to press the optical member, and a contact portion in contact with the gap forming portion, and configured to be elastically deformed so that a relative position between the pressing portion and the contact portion changes, and to cause the pressing portion to press the optical member toward the supporting portion by being fitted in the gap to be elastically deformed. The gap forming portion is provided with a through hole and the plate spring is provided with an engaging portion configured to engage with an inner wall of the through hole, and the elastically deformed plate spring does not separate from the gap due to the engaging portion and the inner wall of the through hole engaging each other.

According to another aspect of the present disclosure, an optical scanning apparatus having a light source configured to emit a light beam, a rotating polygonal mirror configured to deflect the light beam emitted from the light source so a photosensitive member is scanned with the light beam, an optical member configured to guide the light beam deflected by the rotating polygonal mirror to the photosensitive member, and a casing accommodating the optical member therein, the optical scanning apparatus includes a supporting portion formed integrally with the casing inside the casing and supporting the optical member, a projecting portion formed integrally with the casing and projecting toward the inside of the casing from the casing so that a gap is formed between the optical member supported on the supporting portion and the projecting portion, and a plate spring including a pressing portion configured to press the optical member and a contact portion in contact with the projecting portion, the plate spring being configured to be elastically deformed so that a relative position between the pressing portion and the contact portion changes, and to cause the pressing portion to press the optical member toward the supporting portion by being fitted in the gap to be elastically deformed. The projecting portion is provided with a through hole and the plate spring is provided with an engaging portion configured to engage with an inner wall of the through hole, and the elastically deformed plate spring does not separate from the gap due to the engaging portion and the inner wall of the through hole engaging each other.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. A configuration of a conventional optical scanning apparatus will be described first, and then exemplary embodiments will be described.

[Configuration of Conventional Optical Scanning Apparatus]

FIG. 7 illustrates an outline of components of an optical scanning apparatus conventionally generally used. An optical scanning apparatus, which irradiates a photosensitive member with a light beam to form an electrostatic latent image, includes a rotating polygonal mirror 42 serving as a deflector, a motor unit 41 for rotating the rotating polygonal mirror 42, and optical members. The optical members include a collimator lens 43 and a cylindrical lens 44 for shaping a light flux incident on the motor unit 41. The optical members further include one or more fθ lenses (hereinafter referred to as optical lenses) 60 for equalizing a scanning speed of the light beam on the photosensitive member and a reflection mirror 62 for guiding the light beam to the photosensitive member. In the motor unit 41, the rotating polygonal mirror 42 having a number of reflection mirror surfaces on its outer periphery rotates at high speed, thereby deflecting the light beam to be incident on the photosensitive member so that the photosensitive member is scanned with the light beam.

A light amount of the light beam to be guided onto the photosensitive member is deeply related to a density of an image formed on a recording sheet (recording medium). Unintended variation in the light amount causes a phenomenon that the image density is low or high. Particularly if dirt such as dust adheres to an optical component in the optical scanning apparatus, the dust adhering thereto blocks the light beam. Thus, the light amount of the light beam to be guided onto the photosensitive member decreases, so that the image density decreases. As described above, deterioration in image quality by fine dust having a size of 1 µm or less soiling the optical component has been becoming an issue. Usually, the optical component serving as the component of the optical scanning apparatus is accommodated in a casing to be protected from a substance causing dirt. In the following description, a rotation axis direction of the rotating polygonal mirror 42 in the motor unit 41 is a Z-axis direction, a main scanning direction being a scanning direction of the light beam or a longitudinal direction of the reflection mirror 62 is a Y-axis direction, and a direction perpendicular to a Y-axis and a Z-axis is an X-axis direction.

[Casing of Optical Scanning Apparatus]

For comparison with exemplary embodiments described below, FIGS. 8A, 8B, and 8C illustrating the conventional example described above will be described. FIGS. 8A, 8B, and 8C are schematic configuration diagrams illustrating a retaining configuration of an optical component in a casing 185 of a conventional optical scanning apparatus. FIG. 8A is a perspective view illustrating how a plate spring 195 fixes one end of a reflection mirror 62, and is an enlarged view in the vicinity of the end of the reflection mirror 62. FIG. 8B illustrates a position where the reflection mirror 62 and the plate spring 195 are installed in the casing 185. FIG. 8C is a cross-sectional view of a portion where the plate spring 195 fixes the reflection mirror 62, illustrating cut surfaces in a cross section (hatched portions) and a structure of the inner side of the cross section. The other end of the reflection mirror 62 has a similar supporting structure. The reflection mirror 62 is indicated by a lattice portion. The reflection mirror 62 is fixed on a supporting portion 87 in the casing 185 by being pressed by the plate spring 195.

The casing 185 includes a projecting portion 86 projecting from its bottom surface (inner wall surface) formed to attach the plate spring 195 thereto. The projecting portion 86 is formed integrally with the casing 185 to face the reflection mirror 62 supported on the supporting portion 87. An engaging portion 86b serving as a protrusion with which the plate spring 195 engages is provided on a facing surface 86a that faces the reflection mirror 62 in the projecting portion 86 projecting from the casing 185. The engaging portion 86b projects toward the reflection mirror 62 supported on the supporting portion 87 from the facing surface 86a.

The plate spring 195 includes a pressing portion 195a for pressing the reflection mirror 62 on the supporting portion 87 mainly in the X-axis direction, a pressing portion 195b for pressing the reflection mirror 62 on the supporting portion 87 mainly in the −Z-axis direction, and an opening 195c into which the engaging portion 86b is inserted. The plate spring 195 further includes a plate portion 195d being in contact with the facing surface 86a, a plate portion 195e on which the pressing portion 195a is formed, and a plate portion 195f on which the pressing portion 195b is formed. A bending portion 195g connects the plate portions 195d and 195e, and a bending portion 195h connects the plate portions 195d and 195f. The plate portion 195d is provided with the opening 195c having a larger projection area than that of the engaging portion 86b and having an area enough for the engaging portion 86b to enter.

From a viewpoint of space saving and workability of installation, the plate spring 195 is not attached to the casing 185 with a screw but is fixed thereto by a reaction force received by the pressing portion 195a from the reflection mirror 62 supported on the supporting portion 87 and engagement of the engaging portion 86b and an inner wall surface of the opening 195c in the plate spring 195. More specifically, when the optical scanning apparatus is assembled, the plate spring 195 is inserted into a gap between the projecting portion 86 and the reflection mirror 62 on the supporting portion 87 by moving in the −Z-axis direction. The bending portion 195g in the plate spring 195 is elastically bent by being inserted into the gap between the projecting portion 86 and the reflection mirror 62 on the supporting portion 87. As illustrated in FIG. 8C, the engaging portion 86b of the projecting portion 86 enters the inside of the opening 195c provided on the plate portion 195d with the bending portion 195g elastically bent. In this state, the bending portion 195g is elastically deformed, so that the pressing portion 195a presses the reflection mirror 62. The reflection mirror 62 is fixed on the supporting portion 87 by being pressed by the pressing portion 195a.

The opening 195c and the engaging portion 86b constitute a stopper mechanism provided to suppress separation of the plate spring 195 sandwiched between the reflection mirror 62 and the facing surface 86a from between the reflection mirror 62 and the projecting portion 86. In a state illustrated in FIG. 8C, an upper surface 86c of the engaging portion 86b and the opening 195c engage with each other. Thus, the separation of the plate spring 195 from between the reflection mirror 62 and the projecting portion 86 is suppressed.

While the casing 185 is generally formed of resin or a metal member molded by a die, an infinite number of die cut holes H described above are formed on an outer wall of the casing 185, and particularly on a bottom surface of the casing 185 in a formation process described below.

[Reason Why Die Cut Hole is Formed]

For comparison with exemplary embodiments described below, the reason why the die cut hole H is formed on the outer wall of the casing 185 in a process for forming the engaging portion 86b in the casing 185 illustrated in FIG. 8C will be described with reference to FIGS. 9A and 9B. FIG. 9A is a cross-sectional view of a portion where the engaging portion 86b is provided in the casing 185, illustrating cut surfaces of a cross section by hatching and also illustrating a structure on the innermost side of the cross section. FIG. 9B illustrates how two templates are attached together. The casing 185 being a molded product is formed by being sandwiched by a template A and a template B, respectively, from above and from below, as illustrated in FIG. 9A. More specifically, the casing 185 is formed by using roughly two types of templates, i.e., the template A and the template B, and is formed by pouring resin into a gap formed therebetween when the two templates are attached together. The engaging portion 86b in the casing 185 cannot be formed by one template. The engaging portion 86b includes an undercut portion 86d being a lower surface having a protrusion shape. The undercut portion 86d can be formed only when two or more templates are inserted thereinto from an outer shape of a product. Thus, the casing 185 cannot be formed only by the template A. The template B needs to be inserted into the casing 185 (toward the template A), as illustrated in FIG. 9B. When the templates A and B are detached from each other after resin is poured into the gap between the templates A and B to form the casing 185, the template B is drawn from the side of the bottom surface of the casing 185. Therefore, the die cut hole H is formed by the template B on the bottom surface of the casing 185.

[Image Forming Apparatus]

Figure 1:
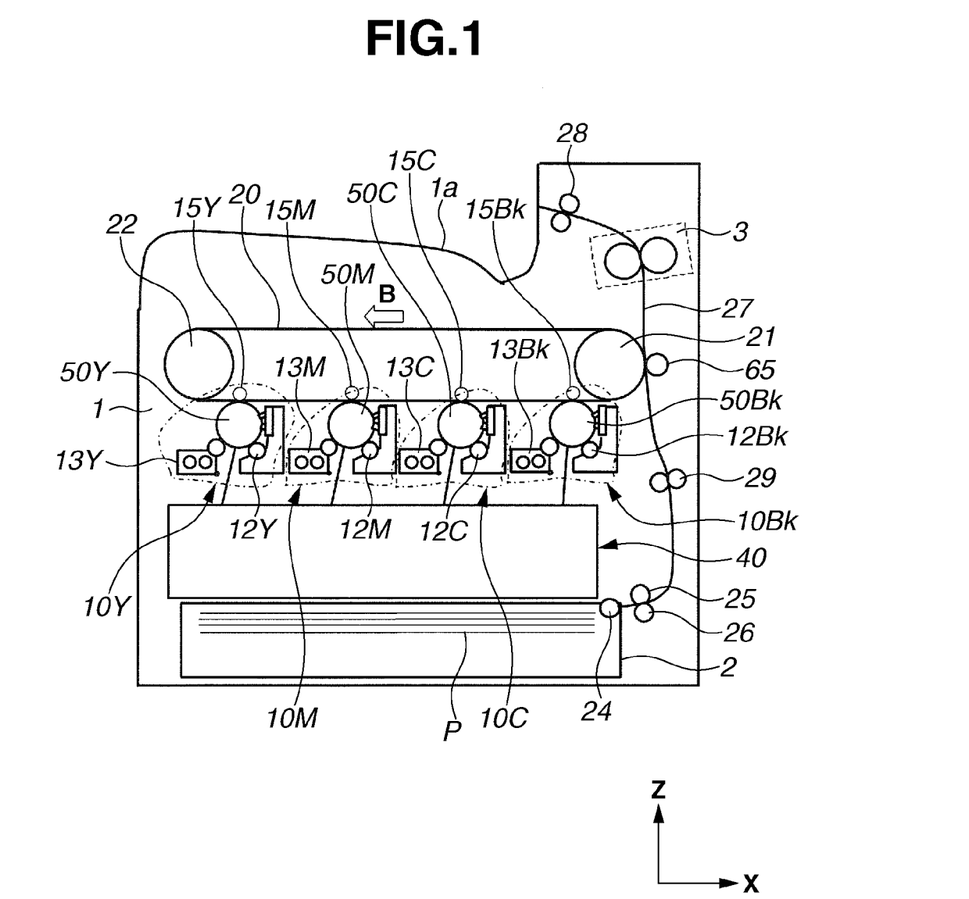
FIG. 1 is a schematic configuration diagram illustrating an outline of an image forming apparatus according to first and second exemplary embodiments.

A configuration of an image forming apparatus according to a first exemplary embodiment will be described. FIG. 1 is a schematic configuration diagram illustrating an overall configuration of a tandem type color laser beam printer according to the present exemplary embodiment. The laser beam printer (hereinafter merely referred to as a printer) includes four image forming engines 10Y, 10M, 10C, and 10Bk (indicated by a one-dot and dash line) for forming toner images for colors, i.e., yellow (Y), magenta (M), cyan (C), and black (Bk). The printer includes an intermediate transfer belt 20 onto which the toner images are respectively transferred from the image forming engines 10Y, 10M, 10C, and 10Bk. The intermediate transfer belt 20 transfers a toner image multiple-transferred on the intermediate transfer belt 20 onto a recording sheet P serving as a recording medium to form a full-color image. Signs Y, M, C, and Bk respectively representing the colors will be omitted unless required.

The intermediate transfer belt 20 is endlessly formed, and is wound around a pair of belt conveyance rollers 21 and 22, and is configured so that the toner images formed by the image forming engines 10 are transferred thereonto while rotating in a direction indicated by an arrow B. A secondary transfer roller 65 disposed at a position opposing the belt conveyance roller 21 nips the intermediate transfer belt 20 therebetween. The recording sheet P is inserted between the secondary transfer roller 65 and the intermediate transfer belt 20, which pressure-contact each other, so that the toner image is transferred thereonto from the intermediate transfer belt 20. The four image forming engines 10Y, 10M, 10C, and 10Bk described above are disposed in parallel below the intermediate transfer belt 20. The toner images formed according to image information about each color are respectively transferred onto the intermediate transfer belt 20 (hereinafter referred to as "primary transfer"). The four image forming engines 10, i.e., the image forming engine 10Y for yellow, the image forming engine 10M for magenta, the image forming engine 10C for cyan, and the image forming engine 10Bk for black are disposed in this order along a rotation direction (a direction indicated by the arrow B) of the intermediate transfer belt 20.

Below the image forming engines 10, an optical scanning apparatus 40 is disposed. The optical scanning apparatus 40 exposes photosensitive drums 50 serving as photosensitive members being respectively provided in the image forming engines 10, according to the image information. The optical scanning apparatus 40 will be described below with reference to FIGS. 2A, 2B, 3A, 3B, and 3C although detailed illustration and description thereof are omitted in FIG. 1. The optical scanning apparatus 40 is shared among the image forming engines 10Y, 10M, 10C, and 10Bk, and includes four semiconductor lasers (not illustrated) for respectively emitting laser beams modulated according to the image information about each color. The optical scanning apparatus 40 includes a rotating polygonal mirror 42 and a motor unit 41. The rotating polygonal mirror 42 deflects the light beams corresponding to the respective photosensitive drums 50 so that the photosensitive drums 50 is scanned with the light beams along an axial direction (the Y-axis direction) of the photosensitive drums 50. The motor unit 41 rotates the rotating polygonal mirror 42. The light beams deflected by the rotating polygonal mirror 42 are guided to an optical member installed in the optical scanning apparatus 40 and respectively guided onto the photosensitive drums 50 to expose the photosensitive drums 50.

Each of the image forming engines 10 includes the photosensitive drum 50 and a charging roller 12. The charging roller 12 charges the photosensitive drum 50 to a uniform background potential. Each of the image forming engines 10 further includes a development unit 13, which develops an electrostatic latent image formed on the photosensitive drum 50 by being exposed with the light beam to form the toner image. The development unit 13 forms the toner image corresponding to the image information about each color on the photosensitive drum 50.

A primary transfer roller 15 is disposed at a position opposite the photosensitive drum 50 in each of the image forming engines 10 so that the intermediate transfer belt 20 is nipped therebetween. A predetermined transfer voltage is applied to the primary transfer roller 15, so that the toner image on the photosensitive drum 50 is transferred onto the intermediate transfer belt 20.

Meanwhile, the recording sheet P is fed from a sheet feeding cassette 2 accommodated in a lower part of a printer casing 1 to the inside of the printer, specifically a secondary transfer position where the intermediate transfer belt 20 and the secondary transfer roller 65 abut on each other. A pickup roller 24 for pulling out the recording sheet P stored in the sheet feeding cassette 2 and a sheet feeding roller 25 are provided in parallel in an upper part of the sheet feeding cassette 2. A retard roller 26 for preventing double feeding of the recording sheet P is disposed at a position opposite the sheet feeding roller 25. A conveyance path 27 of the recording sheet P inside the printer is provided in a substantially vertical direction along a right side surface of the printer casing 1. The recording sheet P, which has been pulled out of the sheet feeding cassette 2 positioned at the bottom of the printer casing 1, is conveyed upward in the conveyance path 27, and fed to a registration roller 29. The registration roller 29 controls timing when the recording sheet P reaches the secondary transfer position. Then, the recording sheet P is fed to a fixing device 3 (indicated by a broken line) provided on the downstream side in a conveyance direction after the toner image has been transferred thereonto at the secondary transfer position. The recording sheet P on which the toner image has been fixed by the fixing device 3 is discharged into a sheet discharge tray 1a provided in an upper part of the printer casing 1 via a discharge roller 28.

In forming the full-color image by the color laser beam printer thus configured, the optical scanning apparatus 40 exposes the photosensitive drums 50 in the image forming engines 10 at predetermined timing, according to the image information about each color. Thus, the latent image corresponding to the image information is formed on the photosensitive drum 50 in each of the image forming engines 10. To obtain a high quality image, the latent image formed by the optical scanning apparatus 40 needs to be reproduced accurately at a predetermined position on the photosensitive drum 50, and an amount of the light beam for forming the latent image needs to be always stable at a desired value.

[Supporting Configuration of Optical Component in Casing]

Figure 2A:
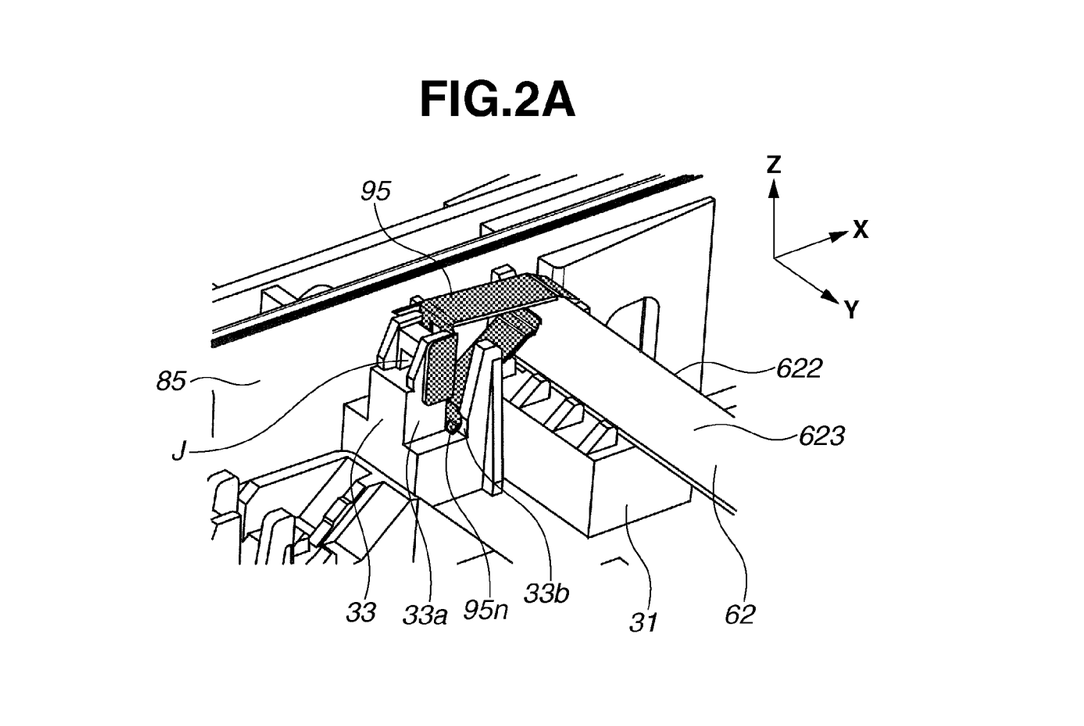
FIGS. 2A and 2B are schematic configuration diagrams illustrating a configuration for improving dust-proof performance according to the first exemplary embodiment.
Figure 2B:
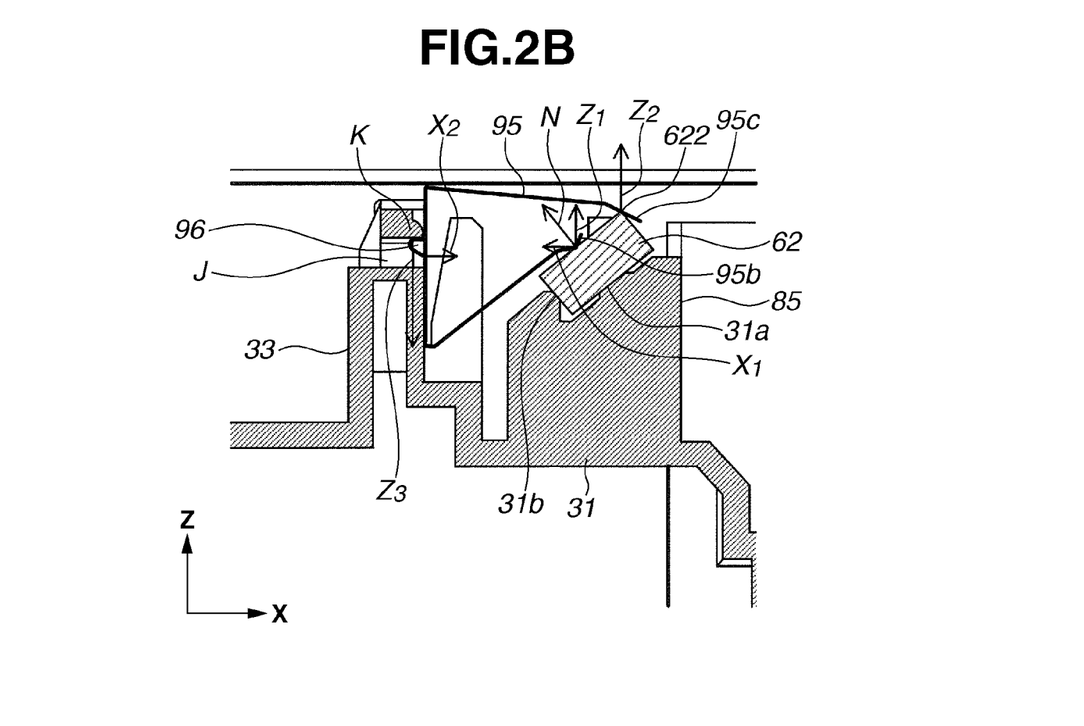
Figure 3A:
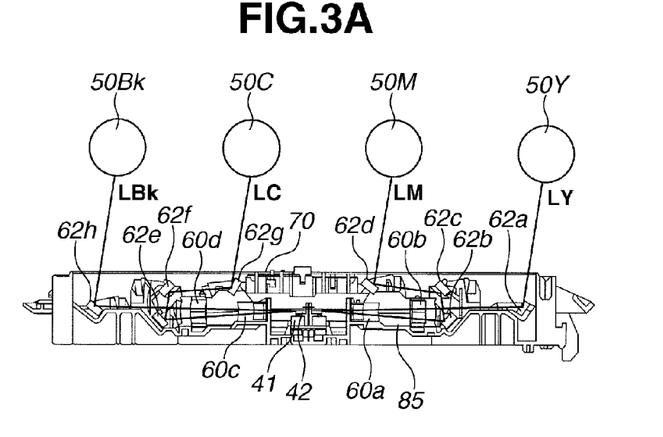
FIGS. 3A, 3B, and 3C are a schematic diagram illustrating an entire image of optical component attachment according to the first exemplary embodiment, a schematic diagram illustrating installation of a plate spring, and a diagram illustrating a configuration of the plate spring, respectively.
Figures 3B, 3C:
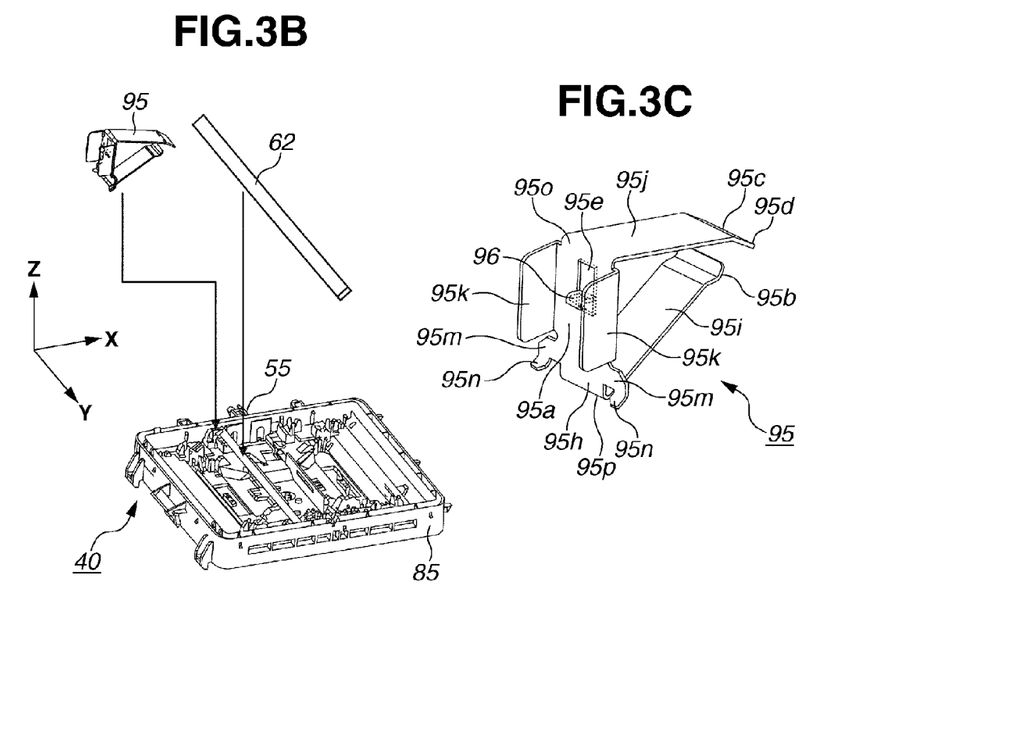

FIGS. 2A and 2B are schematic configuration diagrams illustrating an optical component supporting configuration for improving dust-proof performance according to the present exemplary embodiment. FIG. 3A is a schematic diagram illustrating an entire image of optical component attachment, and FIG. 3B is a schematic diagram illustrating installation of a reflection mirror 62 serving as an optical member and a plate spring 95 serving as its fixing member in the casing 85. The optical scanning apparatus 40 is illustrated in FIG. 3B with an upper cover 70 removed from the casing 85. FIG. 3C illustrates a configuration of the plate spring 95. A light source unit 55 loaded with a light source for emitting light beams (laser light), the rotating polygonal mirror 42 for deflecting the light beams, and the motor unit 41 are installed inside and in the outer periphery of the optical scanning apparatus 40. Furthermore, optical lenses 60a to 60d and reflection mirrors 62a to 62h for guiding each of the light beams onto the photosensitive drum 50 and forming images are installed in the optical scanning apparatus 40.

A light beam LY, corresponding to a photosensitive drum 50Y, emitted from the light source unit 55 is deflected by the rotating polygonal mirror 42, and is incident on the lens 60a. The light beam LY, which has passed through the lens 60a, is incident on the lens 60b, and is reflected by the reflection mirror 62a after passing through the lens 60b. The light beam LY, which has been reflected by the reflection mirror 62a, passes through a transparent window (not illustrated), so that the photosensitive drum 50Y is scanned with the light beam LY.

A light beam LM, corresponding to a photosensitive drum 50M, emitted from the light source unit 55 is deflected by the rotating polygonal mirror 42, and is incident on the lens 60a. The light beam LM, which has passed through the lens 60a, is incident on the lens 60b, and is reflected by the reflection mirrors 62b, 62c, and 62d after passing through the lens 60b. The light beam LM, which has been reflected by the reflection mirror 62d, passes through a transparent window (not illustrated), so that the photosensitive drum 50M is scanned with the light beam LM.

A light beam LC, corresponding to a photosensitive drum 50C, emitted from the light source unit 55 is deflected by the rotating polygonal mirror 42, and is incident on the lens 60c. The light beam LC, which has passed through the lens 60c, is incident on the lens 60d, and is reflected by the reflection mirrors 62e, 62f, and 62g after passing through the lens 60d. The light beam LC, which has been reflected by the reflection mirror 62g, passes through a transparent window (not illustrated), so that the photosensitive drum 50C is scanned with the light beam LC.

A light beam LBk, corresponding to a photosensitive drum 50Bk, emitted from the light source unit 55 is deflected by the rotating polygonal mirror 42, and is incident on the lens 60c. The light beam LBk, which has passed through the lens 60c, is incident on the lens 60d, and is reflected by the reflection mirror 62h after passing through the lens 60d. The light beam LBk, which has been reflected by the reflection mirror 62h, passes through a transparent window (not illustrated), so that the photosensitive drum 50Bk is scanned with the light beam LBk.

The reflection mirrors 62a to 62h illustrated in FIG. 3A correspond to the reflection mirror 62 illustrated in FIG. 7. The lenses 60a to 60d illustrated in FIG. 3A correspond to the optical lens 60 illustrated in FIG. 7. The reflection mirrors 62a to 60h will be described below as the reflection mirror 62.

As illustrated in FIG. 3B, the reflection mirror 62 is fixed to the casing 85 by being pressed toward a mirror supporting portion 31 described below by the plate spring 95 inside the casing 85. A configuration of the plate spring 95 and the casing 85 will be described below with reference to FIGS. 2A, 2B, 3A, 3B, and 3C. The plate spring 95, and the mirror supporting portion 31 and a projecting portion 33 described below constitute a mirror fixing mechanism. The mirror fixing mechanism may be used to fix all the plurality of reflection mirrors 62a to 62h, or may be used to fix some of the reflection mirrors 62a to 62h.

(Configuration of Plate Spring)

The plate spring 95 serving as an elastic member illustrated in FIG. 3C is formed by folding one thin plate. The plate spring 95 includes a first plate portion 95h including a reference surface 95a, and a second plate portion 95i, a third plate portion 95j, and a pair of fourth plate portions 95k that are respectively folded with respect to the first plate portion 95h.

The first plate portion 95h is a contact portion being in contact with the projecting portion 33 described below and receives a repulsive force from the projecting portion 33. A bending portion 95p connects the first plate portion 95h and the second plate portion 95i. The bending portion 95p is formed by folding back the second plate portion 95i in a substantially V shape with respect to the first plate portion 95h. Relative position (a relative angle) between the first plate portion 95h and the second plate portion 95i changes when the bending portion 95p is elastically deformed. A bending portion 95o connects the first plate portion 95h and the third plate portion 95j. The bending portion 95o is formed by folding the third plate portion 95j at a substantially right angle to the first plate portion 95h. Relative position (a relative angle) between the first plate portion 95h and the third plate portion 95j changes when the bending portion 95o is elastically deformed. The pair of fourth plate portions 95k is folded at a substantially right angle to the opposite side of the second plate portion 95i and the third plate portion 95j from both ends of the first plate portion 95h.

The reference surface 95a is one surface of the first plate portion 95h having a thin plate shape, and abuts on a rectangular column portion 33a in the projecting portion 33 provided in the casing 85, and serves as a reference of a position of the plate spring 95 (see FIGS. 2A and 2B). A first pressing portion 95b for pressing the reflection mirror 62 is formed in the second plate portion 95i. The first pressing portion 95b is a portion at a tip end of the second plate portion 95i and bent in a convex shape to project to the opposite side of the first plate portion 95h. When the second plate portion 95i and the first plate portion 95h in the plate spring 95 are inserted between the reflection mirror 62 and the projecting portion 33 in a deflected (compressed) state against an elastic force, the first pressing portion 95b abuts on a mirror reflection surface 623 of the reflection mirror 62. Thus, the first pressing portion 95b presses the reflection mirror 62 toward a first mirror seat surface 31a, described below, serving as a supporting portion for supporting a mirror.

A second pressing portion 95c for pressing the reflection mirror 62 is formed on the third plate portion 95j. The second pressing portion 95c is a portion for pressing the reflection mirror 62 between a tip end 95d of the third plate portion 95j and a folded part obtained by folding the third plate portion 95j at an obtuse angle. The second pressing portion 95c abuts on a ridge portion 622 in the reflection mirror 62. When the plate spring 95 is locked to the projecting portion 33 with the third projecting portion 95j in the plate spring 95 deflected against an elastic force with respect to the first plate portion 95h, the second pressing portion 95c presses the reflection mirror 62 toward the first mirror seat surface 31a and a second mirror seat surface 31b of the mirror supporting portion 31.

A hole portion 95e is an opening provided on the reference surface 95a and penetrating both surfaces of the first plate portion 95h. An engaging portion 96 is an engaging claw projecting from the reference surface 95a by folding a part of the plate spring 95 covering a part of the hole portion 95e to the opposite side of the second plate portion 95i and the third plate portion 95j. Stoppers 95n are formed in a lower part of the first plate portion 95h and at both ends of the bending portion 95p. The stopper 95n abuts on a surface 33b of the projecting portion 33 to receive a normal force in the −X-axis direction from the surface 33b.

Thus, the plate spring 95 causes the engaging portion 96 formed in the plate spring 95 itself to engage with an engaging portion K provided in the casing 85. Thus, a posture of the plate spring 95 can be kept without the plate spring 95 coming off the casing 85 by a repulsive force from the reflection mirror 62. While the portions of the plate spring 95 are illustrated with detailed signs in FIG. 3C, the signs are omitted in the other figures for the sake of simplification.

(Configuration of Projecting Portion and Mirror Supporting Portion)

As illustrated in FIGS. 2A and 2B, the projecting portion 33 for retaining the plate spring 95 and the mirror supporting portion 31 for supporting the reflection mirror 62 to accurately attach the reflection mirror 62 to the casing 85 are integrally formed in the casing 85. The projecting portion 33 includes the rectangular column portion 33a. The projecting portion 33 including the rectangular column portion 33a is a gap forming portion for forming a gap between the reflection mirror 62 supported on the mirror supporting portion 31 (on the supporting portion 87) described below and itself. The rectangular column portion 33a in the Y-axis direction is formed in the casing 85 so that the width of the rectangular column portion 33a is slightly narrower than the width of the pair of fourth plate portions 95k. The rectangular column portion 33a has a function of guiding the plate spring 95 by being inserted between the fourth plate portions 95k when the plate spring 95 is inserted between the reflection mirror 62 and the projecting portion 33 from the +Z-axis direction.

The mirror supporting portion 31 includes the first mirror seat surface 31a and the second mirror seat surface 31b on which the reflection mirror 62 being pressed by the first pressing portion 95b and the second pressing portion 95c in the plate spring 95 abuts. The first mirror seat surface 31a supports a reverse surface of the mirror reflecting surface 623 of the reflection mirror 62 with respect to a pressed point of the reflection mirror 62 to be pressed by the first pressing portion 95b in the plate spring 95.

The rectangular column portion 33a in the projecting portion 33 is provided with a cut hole J. The cut hole J is a through hole penetrating a surface on the opposite side of the mirror supporting portion 31 from a surface, on the side on which the mirror supporting portion 31 is arranged, of the rectangular column portion 33a to separate from the reflection mirror 62 on the mirror supporting portion 31. More specifically, the cut hole J is formed in the projecting portion 33 of the casing 85 so that a direction to which the cut hole J opens is a direction different from a direction (the Z-axis direction) perpendicular to a bottom surface (a plane parallel to an XY plane) of the casing 85. In the present exemplary embodiment, the cut hole J is formed so that the direction in which the cut hole J opens is within a plane parallel to an XZ plane and is a direction (i.e., the X-axis direction) parallel to the bottom surface of the casing 85 as an example.

As illustrated in FIG. 2B, the plate spring 95 is fitted in an elastically deformed state in a gap formed by the projecting portion 33 and the reflection mirror 62 laid on the mirror supporting portion 31. As illustrated in FIG. 2B, the first pressing portion 95b receives a normal force N from the reflection mirror 62. The normal force N is decomposed into a force $Z_1$ exerted in the −Z-axis direction on the plate spring 95 and a force $X_1$ exerted thereon in the −X-axis direction. The force $X_1$ is a force for urging the plate spring 95 toward the rectangular column portion 33a in the projecting portion 33.

On the other hand, in the first pressing portion 95b, the force $Z_1$ is exerted in the +Z-axis direction on the plate spring 95. A force $Z_2$ is exerted in the +Z-axis direction from the reflection mirror 62 on the second pressing portion 95c. The optical scanning apparatus according to the present exemplary embodiment has a configuration in which the engaging portion 96 in the plate spring 95 is caught by an inner wall (the engaging portion K) on the upper side of the cut hole J so that the plate spring 95 does not separate from between the projecting portion 33 and the reflection mirror 62 by the forces $Z_1$ and $Z_2$ being exerted on the plate spring 95. When the engaging portion 96 in the plate spring 95 abuts on the inner wall of the cut hole J, a force $Z_3$ in the −Z-axis direction is exerted on the plate spring 95 at an abutment portion. The force $Z_3$ is balanced with the forces $Z_1$ and $Z_2$. Furthermore, a force $X_2$ in the +X-axis direction is exerted on the plate spring 95 by the reference surface 95a of the plate spring 95 abutting on the rectangular column portion 33a in the projecting portion 33. The force $X_2$ is balanced with the force $X_1$. The stopper 95n abuts on the surface 33b of the projecting portion 33 and receives a normal force N in the −X-axis direction from the surface 33b so that the plate spring 95 does not rotate by a rotation moment in a counterclockwise direction in FIG. 2B to be exerted on the plate spring 95 by the forces $Z_1$, $Z_2$, and $Z_3$. Similar to the forces $X_1$ and $X_2$, respective points of action of the forces $X_1$ and $X_2$ are shifted in the Z-axis direction. Thus, the rotation moment is generated in the counterclockwise direction in FIG. 2B. However, the stopper 95n prevents the plate spring 95 from rotating, as described above.

As described above, the plate spring 95 does not separate from (come off) between the projecting portion 33 and the reflection mirror 62. The plate spring 95 is elastically deformed by being fitted between the projecting portion 33 and the reflection mirror 62. Thus, the reflection mirror 62 is pressed toward the mirror supporting portion 31 upon receipt of a force (a reaction force of the normal force N) from the plate spring 95.

As the above-described cut hole J is provided, a shape of the engaging portion K can be formed without providing the cut hole H described in FIGS. 9A and 9B. The reason for this will be described below.

[Process for Forming Casing]

Figure 4A:
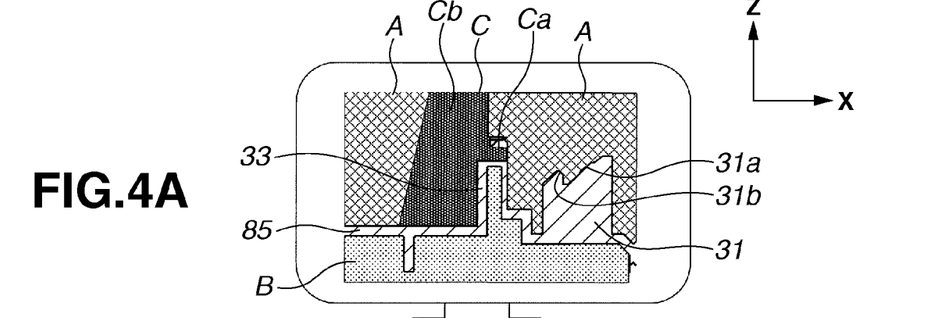
FIGS. 4A, 4B, and 4C are schematic diagrams illustrating a die structure when a casing according to the first exemplary embodiment is formed.
Figure 4B:
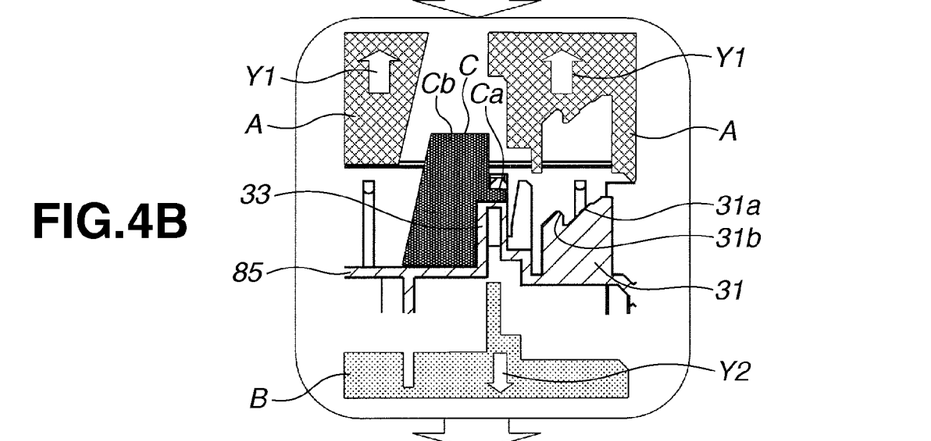
Figure 4C:
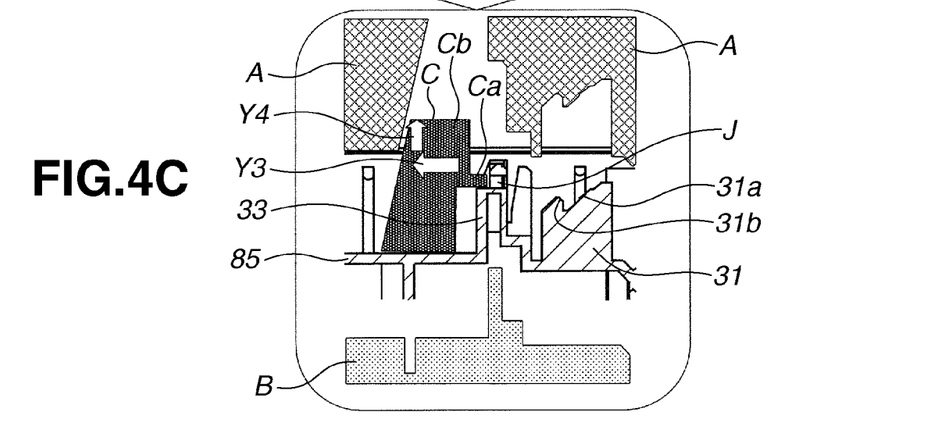

FIGS. 4A, 4B, and 4C are schematic diagrams illustrating a die structure when the casing 85 according to the present exemplary embodiment is formed. A forming die of the casing 85 has respective die structures of forming dies A and B configured to be movable in a vertical direction in FIGS. 4A, 4B, and 4C and forming most of the casing 85, and a forming die C configured to be movable in a direction different from the vertical direction. The forming die C is a forming die for forming the cut hole J including the engaging portion K in the projecting portion 33. The forming die C has a protrusion Ca for forming the cut hole J. The forming die C has a surface, on the opposite side on which the protrusion Ca projects from its main body Cb, inclined in the vertical direction, as illustrated in FIGS. 4A, 4B, and 4C, and has a trapezoidal shape as viewed from a main scanning direction (the Y-axis direction). As illustrated in FIG. 4A, a surface, which abuts on the forming die C, of the forming die A is inclined to be in touch with the inclined surface of the forming die C. The length in the main scanning direction (the Y-axis direction) of the cut hole J is determined depending on the length in the main scanning direction of the protrusion Ca of the forming die C, i.e., the depth of the protrusion Ca (i.e., the thickness of a part of the protrusion Ca) in FIGS. 4A, 4B, and 4C. The width in the Z-axis direction of the cut hole J is determined depending on the length in the Z-axis direction of the protrusion Ca of the forming die C. The length in the Y-axis direction of the protrusion Ca may be at least the length in the Y-axis direction of the engaging portion 96 in the plate spring 95 that has been projected on a YZ plane from the X-axis direction. The length in the Z-axis direction of the protrusion Ca may be at least the length in the Z-axis direction of the engaging portion 96 in the plate spring 95 that has been projected on the YZ plane from the X-axis direction.

As illustrated in FIG. 4A, to form the casing 85, the forming dies A, B, and C are combined, and melted resin to become the casing 85 is injected and filled into a gap between the combined forming dies, followed by cooling. Then, as illustrated in FIG. 4B, the forming die A moves in a direction indicated by an arrow Y1, and the forming die B moves in a direction indicated by an arrow Y2. Thus, a space enough for the forming die C to move is formed on the opposite side (the left side) of the side on which the forming die C has the protrusion Ca. As illustrated in FIG. 4C, the forming die C moves in a direction indicated by an arrow Y3 toward a space on the left side of the forming die C. When the forming die C moves in the direction indicated by the arrow Y3, the protrusion Ca of the forming die C comes off the projecting portion 33 in the formed casing 85. As a result, the cut hole J is formed. The forming die C moves in a direction indicated by an arrow Y4 that is the same direction as the direction indicated by the arrow Y1 in which the forming die A has moved. A space on the left side of the forming die C illustrated in FIG. 4C is formed by moving the forming die A in the direction indicated by the arrow Y1. Thus, only the forming die A may move in the direction indicated by the arrow Y1 before the forming die C moves, and the forming die B may move after the forming die C moves.

In the present exemplary embodiment, the projecting portion 33 is provided in proximity to the mirror supporting portion 31. Thus, the forming die C is moved in a direction away from the mirror supporting portion 31 illustrated in FIGS. 2A and 2B when being drawn from the projecting portion 33. The reason for this will be described. When a distance between the projecting portion 33 and the mirror supporting portion 31 is lengthened, the plate spring 95 needs to be larger. In such a configuration, when a plate spring having low rigidity is used to fix the reflection mirror 62, a position of the reflection mirror 62 varies due to vibration caused by rotation of the rotating polygonal mirror 42. On the other hand, a plate spring having high rigidity is high in cost, so that its use affects the manufacturing cost of the image forming apparatus. Therefore, the projecting portion 33 is provided in proximity to (adjacent to) the mirror supporting portion 31 in a direction of an axis of the lens 60a and/or 60c (X-axis direction). More specifically, the projecting portion 33 faces the mirror supporting portion 31 in the direction of an axis of the lens 60a and/or 60c(X-axis direction).

Thus, the projecting portion 33 and the mirror supporting portion 31 are arranged in proximity to each other. When the forming die C is slid toward the mirror supporting portion 31, therefore, the mirror supporting portion 31 and the forming die C interfere with each other. Accordingly, the protrusion Ca cannot be drawn from the cut hole J. Therefore, a method for forming the casing 85 by sliding the forming die C in a direction away from the mirror supporting portion 31 to draw the protrusion Ca from the cut hole J is used as a method for forming the casing 85 in the present exemplary embodiment.

Figure 5:
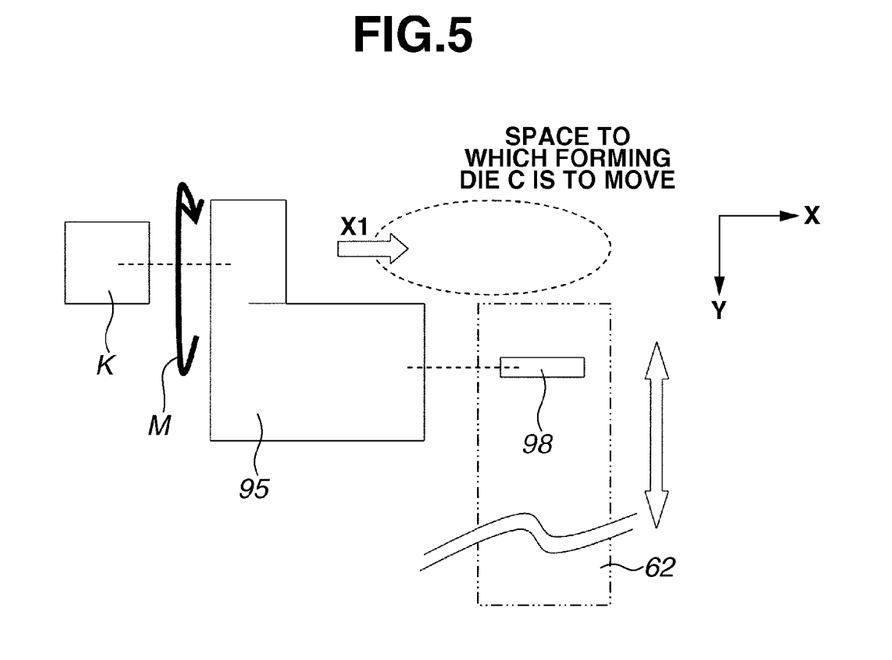
FIG. 5 illustrates a rotation moment according to the first exemplary embodiment.

The following configuration can be used to provide a movement space of the forming die C on the side on which the mirror supporting portion 31 is arranged with respect to the projecting portion 33. The mirror supporting portion 31 can be formed at a position shifted in the main scanning direction (the Y-axis direction), i.e., the longitudinal direction of the reflection mirror 62 from a position of the projecting portion 33. FIG. 5 is a schematic diagram of one of both ends, at which the reflection mirror 62 (indicated by a two-dot and dash line) is supported and fixed, of the reflection mirror 62 as viewed from above (the Z-axis direction). To make illustration easy to understand, the engaging portion K in the projecting portion 33, the plate spring 95, the reflection mirror 62, and a mirror supporting seat surface 98 (corresponding to the first mirror seat surface 31a) of the mirror supporting portion 31 are shifted in a horizontal direction (the X-axis direction). As illustrated in FIG. 5, a space to which the forming die C is to move, as indicated by a broken line, can be provided by shifting the cut hole J serving as the engaging portion K and the mirror supporting seat surface 98 in the longitudinal direction (indicated by an unfilled arrow) of the reflection mirror 62. Thus, the engaging portion K can be formed using a forming die that moves in a direction closer to the mirror supporting portion 31 (a direction indicated by an arrow X1). The cut hole J serves as the engaging portion K because the cut hole J is always formed by the forming die to form the engaging portion K, and the engaging portion K and the cut hole J always constitute a set.

However, the engaging portion K for supporting the plate spring 95 against a repulsive force from the reflection mirror 62 is shifted in the longitudinal direction of the reflection mirror 62. Thus, a rotation moment M is generated in the plate spring 95. Therefore, in a configuration in which the forming die C is moved in a direction closer to the mirror supporting portion 31, the plate spring 95 is not stably retained in the projecting portion 33, so that the reflection mirror 62 cannot be sufficiently pressed. Furthermore, the plate spring 95 needs to be shaped such that the first plate portion 95h including the engaging portion 96, the second plate portion 95i including the first pressing portion 95b, and the third plate portion 95j including the second pressing portion 95c are shifted in the longitudinal direction of the reflection mirror 62. Therefore, the configuration of the plate spring 95 becomes complicated.

On the other hand, in the present exemplary embodiment, the engaging portion K for supporting the plate spring 95 against a repulsive force from the reflection mirror 62 matches (is not shifted from) the plate spring 95 in the longitudinal direction of the reflection mirror 62. Therefore, in the configuration of the present exemplary embodiment, the plate spring 95 is fitted between the projecting portion 33 and the reflection mirror 62 without the rotation moment M being applied thereto. The number of die cut holes (the die cut holes H illustrated in FIG. 9A in the conventional example), which have been dotted on the outer wall of the casing 85 to form an undercut portion (the undercut portion 86d illustrated in FIG. 9B in the conventional example) of the engaging portion K, can be significantly reduced. Thus, the issue that fine dust enters the optical scanning apparatus from outside to soil the optical component, the issue that the cost of the sealing member for closing the die cut hole H is increased, the issue that the number of manufacturing processes for attaching the sealing member to the casing 85 is increased can be improved. The number of die cut holes H to be formed on the outer wall of the casing 85 can be reduced. Thus, a decrease in rigidity of the casing 85 can be suppressed.

As described above, according to the present exemplary embodiment, there can be provided an optical scanning apparatus capable of fixing an optical member using a plate spring without forming a die cut hole and thus having high dust-proof performance. The number of die cut holes H formed in the casing 85 can be reduced. Thus, the rigidity of the casing 85 can be prevented from decreasing.

Figure 6A:
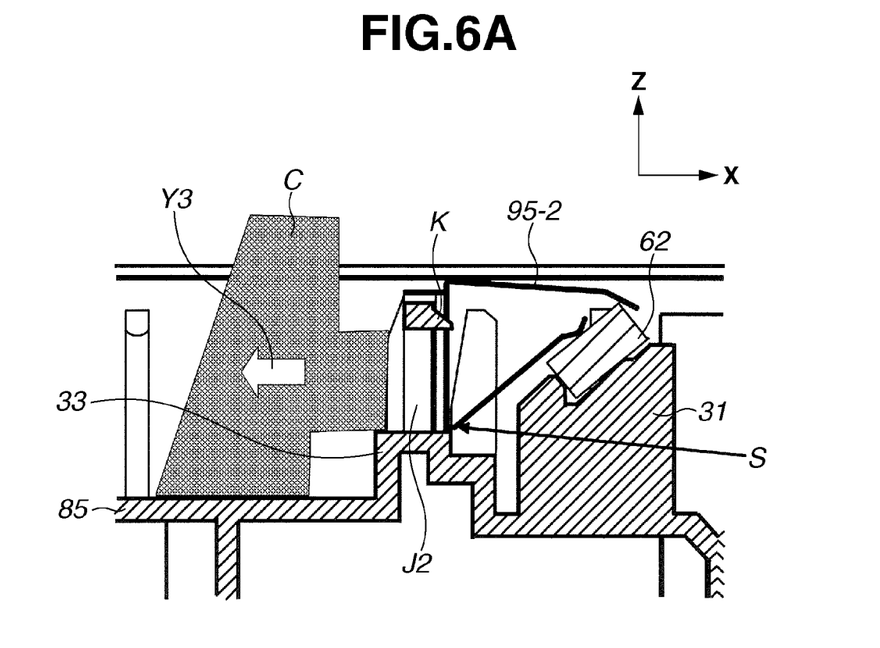
FIGS. 6A and 6B are schematic configuration diagrams illustrating a configuration for improving dust-proof performance according to the second exemplary embodiment.
Figure 6B:
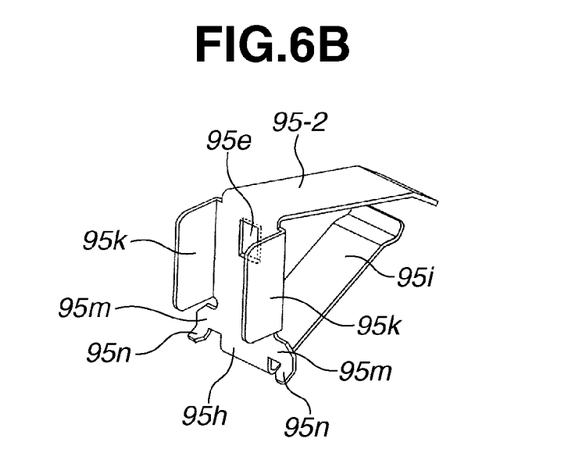

FIGS. 6A and 6B are schematic configuration diagrams illustrating a second exemplary embodiment. In the present exemplary embodiment, a cut hole J2 provided in the vicinity of an engaging portion K forms an opening portion outspreading under a lowermost point S of a plate spring 95-2 that engages with the engaging portion K. The lowermost point S of the plate spring 95-2 corresponds to the bending portion 95p formed by folding the second plate portion 95i in a substantially V shape with respect to the first plate portion 95h in the plate spring 95, described in the first exemplary embodiment.

As the plate spring 95-2 is thus configured, the engaging portion K can be formed as a casing protrusion configured to enter in a hole portion 95e provided in the plate spring 95-2. More specifically, the plate spring 95-2 can be provided with only the hole portion 95e having a simple hole shape without being provided with the engaging portion 96 provided in the plate spring 95 in the first exemplary embodiment. Therefore, the configuration of the plate spring 95-2 can be made simpler. The other configuration of the plate spring 95-2 is similar to that of the plate spring 95 in the first exemplary embodiment, and hence description thereof is not repeated. In this case, the engaging portion K in a casing 85 engages with the hole portion 95e in the plate spring 95-2.

The length in a Z-axis direction of the cut hole J2 may be at least the length in the Z-axis direction of a portion from a portion where the engaging portion K engages with the hole portion 95e in the plate spring 95-2 to the lowermost point S that has been projected onto a YZ plane from an X-axis direction, i.e., may be a length enough for the lowermost point S of the plate spring 95-2 to enter the cut hole J2. The length in a Y-axis direction of the cut hole J2 may be at least the width (the length in the Y-axis direction) of a first plate portion 95h in the plate spring 95-2. In this case, a fourth plate portion 95k in the plate spring 95-2, for example, may sandwich a rectangular column portion 33a in a projecting portion 33 from both the sides in the Y-axis direction, as illustrated in FIG. 2A in the first exemplary embodiment. The fourth plate portion 95k in the plate spring 95-2, for example, may enter the cut hole J2 to press the projecting portion 33 outward from inside the cut hole J2. Furthermore, in the first plate portion 95h in the plate spring 95-2, only a portion having the same length as that in the Y-axis direction of the hole portion 95e may have a shape to cut into the cut hole J2, and the length in the Y-axis direction of the cut hole J2 may be not less than the length in the Y-axis direction of the hole portion 95e. The shape of the plate spring 95-2 can be formed by changing a configuration of each of the portions in the plate spring 95-2 in various forms so that the engaging portion K engages with the hole portion 95e and the lowermost point S of the plate spring 95-2 enters the cut hole J2. To support the plate spring 95-2 that has been changed in various forms, a configuration of the projecting portion 33 can also be changed depending on the configuration of the plate spring 95-2.

As described above, according to the present exemplary embodiment, there can be provided an optical scanning apparatus capable of fixing an optical member using a plate spring without forming a die cut hole and thus having high dust-proof performance.

The casing 85 including the cut hole J described in the first and second exemplary embodiments is applicable to a casing in which an engaging portion for engaging a plate spring for pressing an optical component is to be formed. The present invention is not limited to the above-described optical scanning apparatus but applicable to an optical scanning apparatus in which a plate spring engages with a casing to press an optical component toward the casing. Furthermore, the present invention is not limited to the image forming apparatus described in FIG. 1 but applicable to an image forming apparatus including an optical scanning apparatus in which a plate spring engages with a casing to press an optical component toward the casing.

According to the exemplary embodiments of the present invention, there can be provided an optical scanning apparatus capable of fixing an optical member using a plate spring without forming a die cut hole and thus having high dust-proof performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-049101 filed Mar. 12, 2013, which is hereby incorporated by reference herein in its entirety.

What is claimed is:

1. An optical scanning apparatus including a light source configured to emit a light beam, a rotating polygonal mirror configured to deflect the light beam emitted from the light source so that a photosensitive member is scanned with the light beam, an optical member configured to guide the light beam deflected by the rotating polygonal mirror to the photosensitive member, and a casing accommodating the optical member therein, the optical scanning apparatus comprising:
   a supporting portion formed integrally with the casing inside the casing and supporting the optical member;
   a gap forming portion formed integrally with the casing inside the casing so a gap is formed between the optical member supported by the supporting portion and the gap forming portion; and
   a plate spring including a pressing portion configured to press the optical member, and a contact portion in contact with the gap forming portion, and configured to be elastically deformed so that a relative position between the pressing portion and the contact portion changes, and to cause the pressing portion to press the optical member toward the supporting portion by being fitted in the gap to be elastically deformed,
   wherein the gap forming portion is provided with a through hole and the plate spring is provided with an engaging portion configured to engage with an inner wall of the through hole, and the elastically deformed plate spring does not separate from the gap due to the engaging portion and the inner wall of the through hole engaging each other.

2. The optical scanning apparatus according to claim 1, wherein a plurality of fixing mechanisms, each including the supporting portion, the gap forming portion to fix the optical member inside the casing, and the plate spring, are respectively provided at both ends of the optical member in a longitudinal direction of the optical member.

3. The optical scanning apparatus according to claim 1, wherein the optical member is a reflection mirror configured to reflect the light beam deflected by the rotating polygonal mirror.

4. The optical scanning apparatus according to claim 2, wherein the optical member is a plurality of reflection mirrors configured to reflect the light beam deflected by the rotating polygonal mirror, and
   wherein the plurality of fixing mechanisms, each including the supporting portion, the gap forming portion to fix the reflection mirrors inside the casing, and the plate spring, are respectively provided for each of the plurality of reflection mirrors at both ends of the optical member in a longitudinal direction of each of the reflection mirrors.

5. The optical scanning apparatus according to claim 1, wherein the gap forming portion is a projecting portion projecting toward an inside of the casing from the casing.

6. The optical scanning apparatus according to claim 1, wherein the supporting portion and the gap forming portion are formed in the casing to be adjacent each other.

7. The optical scanning apparatus according to claim 6, wherein the supporting portion and the gap forming portion are formed in the casing so the supporting portion contacts a reverse surface at a pressed point of the reflection mirror to be pressed by the pressing portion.

8. The optical scanning apparatus according to claim 6, wherein the casing is formed by combining a plurality of forming dies, and
   wherein the through hole is formed by moving, when a forming die for forming the through hole out of the plurality of forming dies is drawn from the through hole, the forming die in a direction away from the gap formed by the optical member supported on the supporting portion and the gap forming portion.

9. An optical scanning apparatus including a light source configured to emit a light beam, a rotating polygonal mirror configured to deflect the light beam emitted from the light source so a photosensitive member is scanned with the light beam, an optical member configured to guide the light beam deflected by the rotating polygonal mirror to the photosensitive member, and a casing accommodating the optical member therein, the optical scanning apparatus comprising:
   a supporting portion formed integrally with the casing inside the casing and supporting the optical member;
   a projecting portion formed integrally with the casing and projecting toward the inside of the casing from the casing so a gap is formed between the optical member supported on the supporting portion and the projecting portion; and a plate spring including a pressing portion configured to press the optical member and a contact portion being in contact with the projecting portion, the plate spring being configured to be elastically deformed so that a relative position between the pressing portion and the contact portion changes, and to cause the pressing portion to press the optical member toward the supporting portion by being fitted in the gap to be elastically deformed, wherein the projecting portion is provided with a through hole and the plate spring is provided with an engaging portion configured to engage with an inner wall of the through hole, and the elastically deformed plate spring does not separate from the gap by the engaging portion and the inner wall of the through hole engaging each other.

10. The optical scanning apparatus according to claim 9, wherein fixing mechanisms including the supporting portion, the projecting portion to fix the optical member inside the casing, and the plate spring, are respectively provided at both ends in a longitudinal direction of the optical member.

11. The optical scanning apparatus according to claim 9, wherein the optical member is a reflection mirror configured to reflect the light beam deflected by the rotating polygonal mirror.

12. The optical scanning apparatus according to claim 10, wherein the optical member is a plurality of reflection mirrors configured to reflect the light beam deflected by the rotating polygonal mirror, and wherein fixing mechanisms each including the supporting portion, the projecting portion to fix the reflection mirrors inside the casing, and the plate spring are respectively provided for each of the plurality of reflection mirrors at both ends in a longitudinal direction of each of the reflection mirrors.

13. The optical scanning apparatus according to claim 9, wherein the supporting portion and the projecting portion are formed in the casing to be adjacent each other.

14. The optical scanning apparatus according to claim 13, wherein the supporting portion and the gap forming portion are formed in the casing so that the supporting portion contacts a reverse surface at a pressed point of the reflection mirror to be pressed by the pressing portion.

15. The optical scanning apparatus according to claim 13, wherein the casing is formed by combining a plurality of forming dies, and wherein the through hole is formed by moving, when a forming die for forming the through hole out of the plurality of forming dies is drawn from the through hole, the forming die in a direction away from the gap formed by the optical member supported on the supporting portion and the projecting portion.

16. An image forming apparatus comprising:

a photosensitive member;

the optical scanning apparatus according to claim 1 configured to irradiate the photosensitive member with a light beam to form an electrostatic latent image;

a development unit configured to develop the electrostatic latent image formed by the optical scanning apparatus to form a toner image; and a transfer unit configured to transfer the toner image formed by the development unit onto a recording medium.

17. An image forming apparatus comprising:

a photosensitive member;

the optical scanning apparatus according to claim 9 configured to irradiate the photosensitive member with a light beam to form an electrostatic latent image;

a development unit configured to develop the electrostatic latent image formed by the optical scanning apparatus to form a toner image; and a transfer unit configured to transfer the toner image formed by the development unit onto a recording medium.

* * * * *